E. E. WEAVER.
SPRING SUSPENSION MECHANISM FOR VEHICLES.
APPLICATION FILED APR. 6, 1920.
1,401,840.
Patented Dec. 27, 1921.
3 SHEETS—SHEET 1.
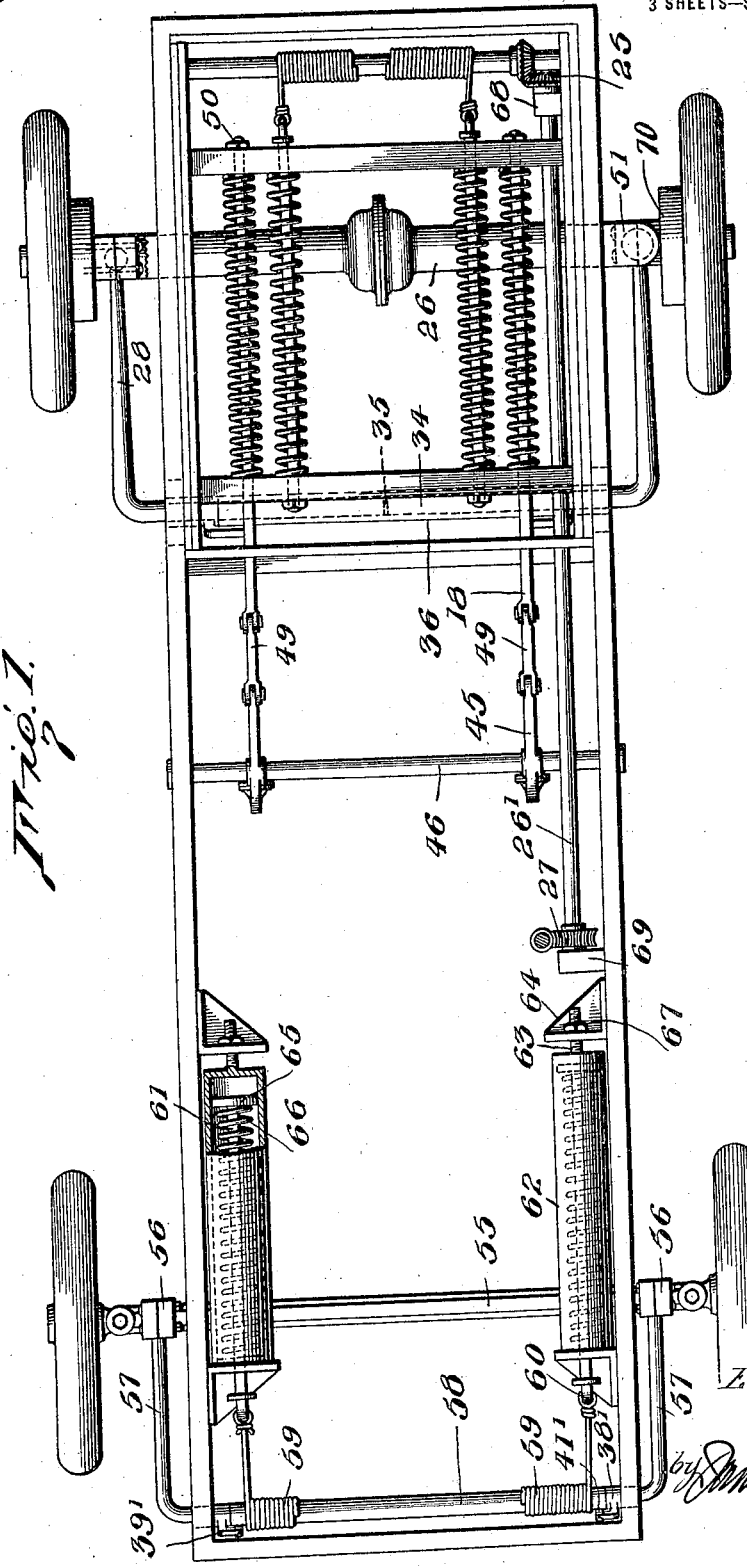

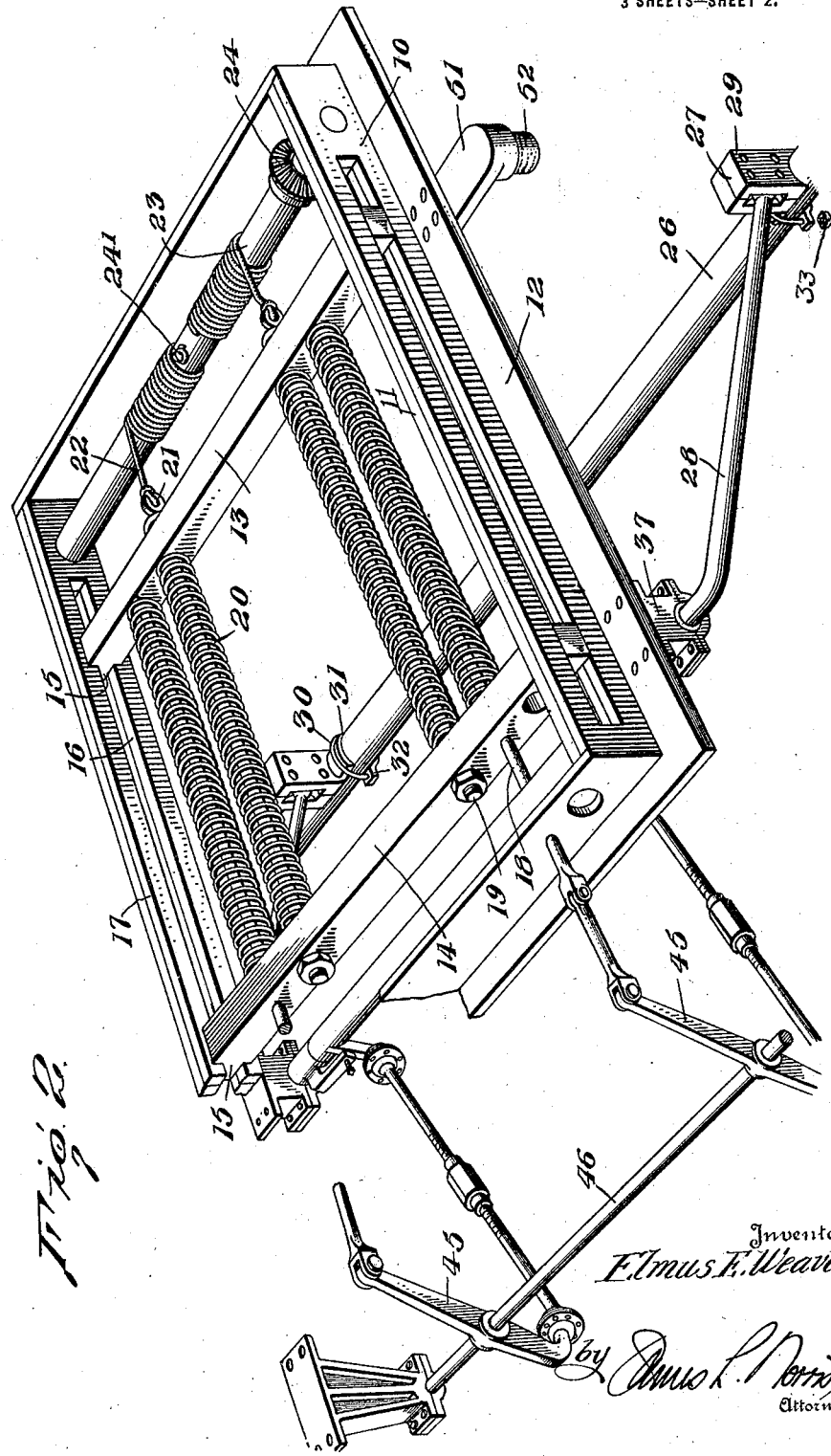

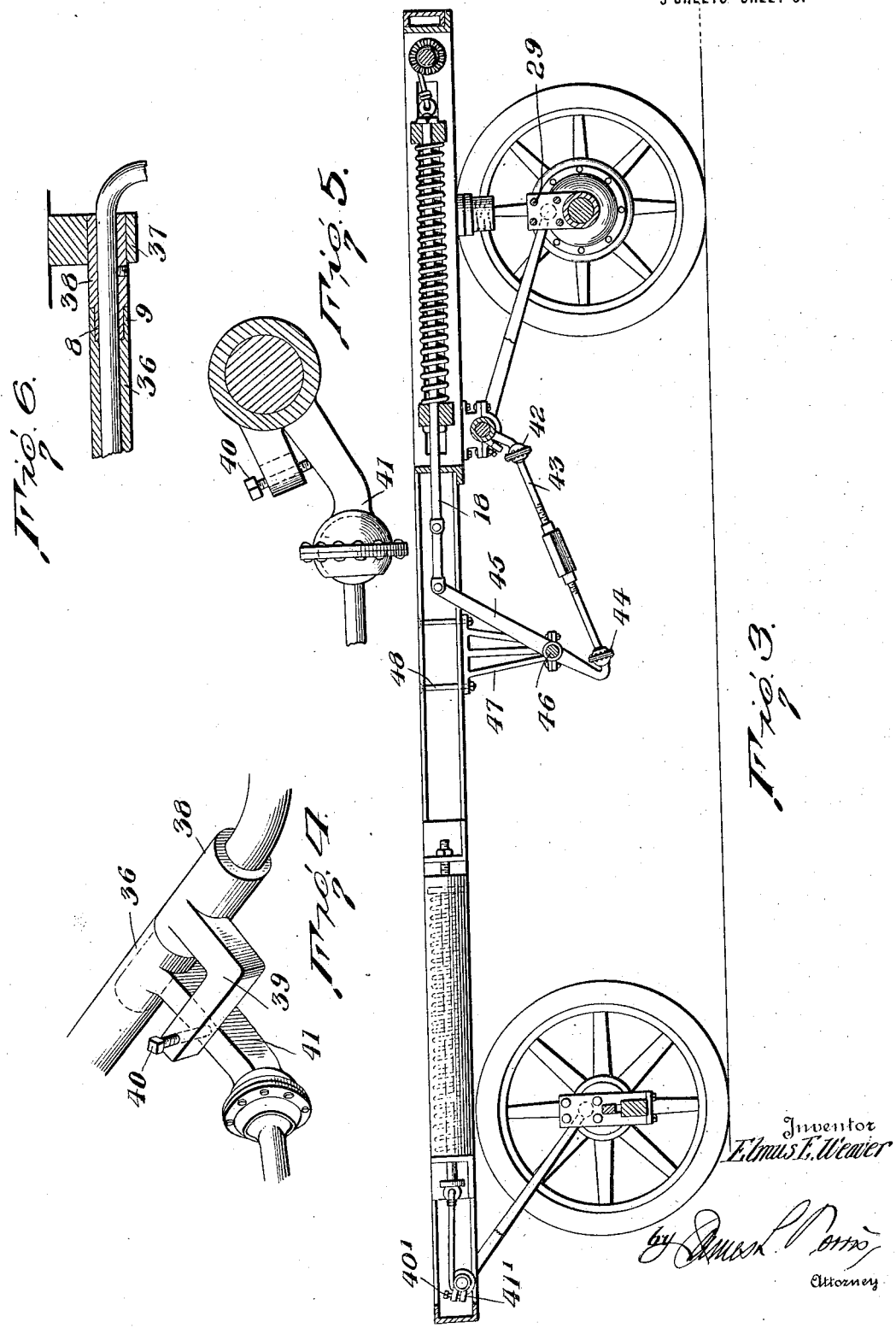

UNITED STATES PATENT OFFICE.

ELMUS E. WEAVER, OF BOISE, IDAHO, ASSIGNOR TO WEAVER SPRING COMPANY, OF BOISE, IDAHO, A CORPORATION OF IDAHO.

SPRING-SUSPENSION MECHANISM FOR VEHICLES.

1,401,840.     Specification of Letters Patent.     Patented Dec. 27, 1921.

Application filed April 6, 1920. Serial No. 371,646.

*To all whom it may concern:*

Be it known that I, ELMUS E. WEAVER, a citizen of the United States, residing at Boise, in the county of Ada and State of Idaho, have invented new and useful Improvements in Spring-Suspension Mechanism for Vehicles, of which the following is a specification.

This invention relates to spring suspensions for vehicles of various kinds but is more particularly adapted to spring suspensions of motor vehicles. The spring suspension of this application is of the general type shown and described in my co-pending application, Serial No. 311,759, filed July 18, 1919, and embodies improvements in the structure therein disclosed.

The object of the invention is to substitute for the ordinary leaf springs of a motor vehicle a plurality of coil springs. It has been found that coil springs arranged according to my invention give easier riding qualities, are less liable to breakage, the tension of the springs can be adjusted to suit the load, and furthermore, the improved mechanism is more economical to manufacture and easier to construct.

It is also contemplated by this invention to assemble my spring suspension device in a unitary structure which can be easily attached to the frame of any commercial motor vehicle whereby the new spring suspension may be readily applied to complete motor vehicles by simply removing the old leaf springs and incorporating my unitary structure on the frame thereof.

Reference is made in the following specification to the accompanying drawings, in which:

Figure 1 is a plan view of my device as applied to the frame of a motor vehicle.

Fig. 2 is a perspective view of my improved device as applied to the rear spring suspension of a motor vehicle.

Fig. 3 is a longitudinal sectional view of the motor vehicle showing my spring suspension applied to the front and rear.

Fig. 4 is a detail view of the connection between the rear rods and the sleeve embracing them.

Fig. 5 is a sectional view of the same, and

Fig. 6 is a sectional view showing the arrangement of the sectional shaft and its sleeve.

Like numerals represent corresponding parts throughout the several views of the drawing.

By referring to Fig. 2, it will be seen that the device comprises the frame 10 which is preferably made of angle pieces properly secured together, one arm 11 of the angle being adapted to brace the vertical side of the frame and arm 12 extending below the same, in which position the angle frame may be secured to the frame of the vehicle by bolts, rivets or the like. Cross-heads 13 and 14 extend transversely across the frame members, the opposite ends of these cross-heads being reduced as denoted at 15 in order to engage within longitudinal slot 16 formed in the vertical arm 11 of the angle and extending therethrough into a slot formed in the filler piece 17 disposed in the hollow channel of the vehicle frame. Rods 18 and 19 extend longitudinally through the cross-heads 13 and 14 and are embraced by coil springs 20. Springs 20 bear at their opposite ends upon the cross-heads and are adapted to be compressed therebetween. Each of the rods 19 terminates at the rear end after passing through the cross-head 13 in an eye loop 21 to which is respectively secured one end of a cable 22 which is wrapped several times around a shaft 23 and has its opposite end secured thereto at 24'. The shaft 23 is journaled in suitable bearings provided in the upright arms 11 and filler pieces 17, said bearings being located beyond the termination of the slots 16. A bevel gear 24 is secured to the shaft 23 and meshes with a gear 25 secured to a shaft 26', passing forward through the angle frame and journaled in bearing 68 secured to one angle and bearing 69 secured to one side of the frame of the vehicle and rotation is imparted to said shaft 26' through worm gearing 27 operated by a hand wheel (not shown) in convenient reach of the operator of the vehicle.

Near each end of the rear axle casing 26, hereinafter also generically termed rear axle, is secured a split bearing 27 which is adapted to receive the ball end of rod 28. The two parts of the bearing 27 are secured together by means of fastening devices 29 which also pass transversely through the hub 70 of the rear axle and the bearing is further secured to the rear axle by means of U-shaped bolts 30 which engage the flanges 31 and a curved bar 32 that embraces the underside of the axle casing 26, the parts being firmly secured together by nuts 33. The rods 28 are substantially L-shape and extend from bearings 27 located on opposite sides of the rear axle near the brake hubs into a sleeve member 36. The rods 28 pass partially through the sleeve member 36 and the ends thereof are spaced apart, as shown at 35. The rods are journaled in suitable bearings 37 secured to the lower arm 12 of the angle frame by means of a collar 38 secured to said rods and normally located within the bearings 37 but projecting beyond the same for a purpose which will hereinafter be described. The projecting portion is reduced at 8 in order to provide a suitable bearing for the sleeve 36 which is correspondingly counterbored at 9. An L-shaped arm 39 having near one end a threaded aperture for receiving a set screw 40 is secured to the projecting portion of collar 38. The lower ends of the set screws 40 are adapted to engage arms 41 which are integrally secured to each end of the sleeve 36. The free end of each arm 41 is enlarged and provided with a split socket bearing 42 for receiving the ball end of an adjustable threaded rod 43. The other ball end of the rod 43 is received within the split socket bearing 44 of a lever 45. Lever 45 is secured to a shaft 46 journaled in brackets 47 which are clamped to opposite sides of the frame of the motor vehicle by means of the bolts 48 passing through the flanges of the channel structure. It will be understood that these brackets may be located at suitable points along the vehicle frame depending on the type of vehicle on which they are employed. The upper end of the lever 45 is forked so as to pivotally receive one end of a link 49, the other end of which is pivotally connected to the free end of the rod 18. The rods 18 pass through alining holes made in the cross-heads 13 and 14 and the rear ends thereof are provided with threads adapted to engage retaining nuts 50. The horizontal arm of each side of the angle frame is preferably provided with an extension 51 having mounted therein a bumper 52 of resilient material which is so located that when the body is depressed a sufficient extent the bumper 52 will contact with the upper surface of the split bearings 27, thereby limiting, to the proper degree, the possible depression of the vehicle body.

As shown in Fig. 1, the front end of the motor vehicle is also supported by means of my improved spring suspension although it will be understood that the rear suspension may be used independently of the front suspension or that the front suspension alone may be used. As illustrated in Fig. 1, the front axle 55 has secured thereto near each end split bearings 56 similar in construction to the split bearings 27 of the rear axle. L-shaped rods 57 having suitable collars 38' are mounted to oscillate in the bearings 56 and these rods are connected to a sleeve 58 by means of L-shaped arms 39', set screws 40' of collars 38' and cooperating arms 41' of the sleeve, in a manner similar to the corresponding construction described above for the rear spring suspension. The sleeve 58 has secured thereto cables or other flexible members 59 which, after being coiled about the sleeve several times, extend backwardly and engage the eye loops 60 formed on the end of rods 61. Each rod 61 passes through a hollow cylindrical casing 62 having at one end a reduced extension 63 adapted to pass through an aperture formed in an angle bracket 64 secured in proper position on the side frame of the vehicle. Within the casing the rod 61 is formed with a head 65 against which one end of a coil spring 66 is adapted to bear, the other end bearing against the forward end of the casing 62. A nut 67 engages the threaded end of the reduced portion 63 of the casing and it is evident that by adjusting the position of the nut 67 the tension on the spring 66 may be controlled within certain limits.

The vehicle frame and body and the load carried thereby are supported by the coil springs, being transmitted to the rear springs through rods 28, sleeve 36, levers 45, the links 43 and 49, and to the front springs through rods 57, sleeve 58 and cable connections 59. If the frame of the vehicle approaches the rear axle it may be raised by increasing the tension on the rear spring by turning shaft 23 in the proper direction by means of the hand wheel disposed near the driver of the vehicle and the connected gearing. Rotation of the shaft 23 in the opposite direction of course reduces the tension on the rear springs. The adjusting nut 67, threaded on the stem 63 of the casing 62 provides the only adjusting means for the front springs, as the load on the front springs is usually more constant than that of the rear springs.

My invention provides a smooth riding spring suspension inasmuch as the only yielding motion is vertical and the forces acting on the springs are all applied longitudinally of the vehicle frame. A force exerted on one side or one corner of the vehicle results in an even application to both sides of the springs on account of the actuation of shaft 46 and its attached levers 45, so that the frame and body of the vehicle will be maintained substantially horizontally.

In the appended claims, the term "axle" is used to denote generically an axle, a casing for an axle or any structure equivalent thereto.

It is evident that those skilled in the art may vary the details of construction as well as the arrangement of parts without departing from the spirit and scope of the invention and, therefore, I do not wish to be limited to the above disclosure except as may be required by the appended claims.

I claim:—

1. A spring suspension for vehicles comprising rods adapted to be connected to one of the axles of a vehicle and mounted to swing in an arc in consequence of relative vertical movements between the vehicle body and the axle, a sleeve embracing portions of both of said rods, connections between said rods and sleeve, spring means, and mechanism connecting said spring means and sleeve, in such manner that the swinging movements of said rods are yieldingly resisted by said spring means.

2. A spring suspension for vehicles comprising bearings secured to the rear axle thereof, rods adapted to oscillate in said bearings in consequence of relative vertical movements between the vehicle body and the rear axle, a sleeve loosely mounted on portions of said rods, connections between said rods and sleeve, spring means, and means connecting said spring means and sleeve in such manner that the oscillatory movements of said rods are yieldingly resisted by said spring means.

3. A spring suspension for vehicles comprising rods adapted to be connected to one of the axles of a vehicle near the opposite ends thereof and mounted to swing in an arc in consequence of relative vertical movements between the vehicle body and the axle, a sleeve embracing portions of said rods, adjustable connections between said rods and sleeve, spring means, and means connecting said spring means and sleeve, said means including a rotatable shaft arranged transversely of the vehicle having levers secured thereto near each end, whereby the swinging movements induced by one of said rods are uniformly resisted by said spring means.

4. A spring suspension for vehicles comprising rods adapted to be connected to one of the axles of a vehicle near the opposite ends thereof and mounted to swing in an arc in consequence of relative vertical movements between the vehicle body and the axle, a sleeve embracing portions of said rods, separate connections between said rods and sleeve, spring means, and means interposed between said spring means and sleeve including levers rigidly connected in spaced relation in such manner that the swinging movements induced by one of said rods are uniformly resisted by said springs means.

5. A spring suspension for vehicles comprising rods adapted to be connected to one of the axles of a vehicle and mounted to swing in an arc in consequence of relative vertical movements between the vehicle body and the axle, a sleeve embracing a portion of said rods, connections between said rods and sleeve, spring means and means interposed between said spring means and sleeve including pivoted levers each having one end connected with said spring means and the other end connected to said sleeve.

6. A spring suspension for vehicles comprising rods adapted to be connected to one of the axles of a vehicle and mounted to swing in an arc in consequence of relative vertical movements between the vehicle body and the axle, a sleeve embracing a portion of said rods, adjustable engaging means between said rods and sleeve, and means interposed between said spring means and sleeve including pivoted levers each having a connection at one end with said spring means and a link connection at the other end with said sleeve.

7. A spring suspension for vehicles comprising a unitary frame structure adapted to be secured to the frame of a vehicle, a coil spring arranged longitudinally in said frame in sets at opposite sides of the vehicle, a rotatable shaft arranged transversely of the vehicle and levers secured to said shaft at opposite sides of the vehicle, said levers having upstanding arms connected respectively to the corresponding set of springs and depending arms connected to one of the axles of the vehicle in such manner that the relative vertical movements between said axle and frame are communicated to said shaft and uniformly distributed to said spring sets.

8. A spring suspension for vehicles comprising a unitary frame structure adapted to be secured to the frame of the vehicle, spring means carried by said frame, a shaft rotatably mounted in said frame and connected to said means for adjusting the spring tension and mechanism connecting said spring means to one of the axles of the vehicle for supporting the load and communicating the vertical movements of said axle thereto.

9. A spring suspension for vehicles comprising a structural angle frame adapted to be attached to the channel frame of the vehicle, one arm of each of the side angles bearing against the flanges of the channel frame pieces of the vehicle and the other arm extending beneath and contacting with the surface of the flanges, spring means carried by said frame and means for transmitting the load and the vertical movements of one of the axles of the motor vehicle to said spring means.

10. A spring suspension for vehicles comprising a structural angle frame adapted to be attached to the channel frame of the vehicle, one arm of each of the side angles being slotted for a portion of its length and bearing against the flanges of the channel frame pieces of the vehicle and the other arm extending beneath and contacting with the surface of one of the flanges, cross-heads having projecting portions slidably mounted in said slots, spring means compressed between said cross-heads and means for transmitting the load and the vertical movements of one of the axles of the motor vehicle to said spring means through said cross-heads.

11. A spring suspension for vehicles comprising a structural angle frame adapted to be attached to the channel frame of the vehicle, one of the arms of the side angles being slotted for a portion of its length, cross-heads slidably mounted in said slots, spring means compressed between said cross-heads, means for transmitting the load and the vertical movements of one of the axles of the motor vehicle to one of said cross-heads and means connected with the other cross-head and journaled in said angle frame for adjusting the tension of said spring means.

12. A spring suspension for vehicles comprising a structural angle frame adapted to be attached to the channel frame of the vehicle, one of the arms of the side angles being slotted for a portion of its length, cross-heads slidably mounted in said slots, spring means compressed between said cross-heads, means for transmitting the load and the vertical movements of one of the axles of the motor vehicle to one of said cross-heads, means connected with the other cross-head and journaled in said angle frame for adjusting the tension of said spring means and mechanism extending through said frame for actuating said last-named means from the vicinity of the driver's seat.

13. A spring suspension for vehicles comprising a unitary frame adapted to be attached to the frame of the vehicle in substantially horizontal position, said frame having cross-heads slidably mounted therein, coil springs disposed longitudinally between said cross-heads, connecting means between said springs and one of the axles of the vehicle for communicating a load and the vertical movements of the axle to one of said cross-heads, and means connected to the other cross-head for adjusting the tension of the springs.

14. A spring suspension for vehicles comprising a unitary frame adapted to be attached to the frame of the vehicle, coil springs mounted in said frame and means for transmitting and applying the load and the relative vertical movements of one of the axles of the vehicle to said springs along the longitudinal axes thereof, said means including a shaft rotatably mounted in said frame and connected to said coil springs for adjusting their tension and gearing for operating said shaft from the driver's seat of the vehicle.

15. A spring suspension for vehicles comprising a unitary frame adapted to be attached to the frame of the vehicle, spring means supported by said frame, brackets secured to the frame of the vehicle a shaft journaled in said brackets, levers secured to said shaft, a connection from one end of each lever to said spring means, a sleeve and mechanism connecting the other end of each lever to said sleeve and independent connections from said sleeve to opposite sides of an axle of the vehicle whereby relative vertical movements between the axle and frames are uniformly communicated to said spring means.

16. A spring suspension for vehicles comprising coil springs arranged longitudinally of the frame on opposite sides of the vehicle, rods oscillatably connected on opposite sides of the vehicle to one of the axles, and mechanism whereby the oscillation of one of said rods compresses said springs uniformly along their longitudinal axes.

17. A spring suspension for vehicles comprising a unitary frame structure secured to the body of the vehicle, coil springs longitudinally arranged in said frame, bearings secured to an axle of the vehicle near each end thereof, said bearings having sockets formed therein, rods journaled in said frame, each rod having one end mounted for oscillation in one of said sockets during relative movements between the vehicle frame and axle, means connecting said rods to the coil springs whereby the oscillations of said rods are yieldingly resisted, and means mounted on said frame adapted to coöperate with said bearings for limiting the oscillatory movements of said rods in one direction.

In testimony whereof I have hereunto set my hand.

ELMUS E. WEAVER.